United States Patent
Kolawa et al.

(10) Patent No.: US 6,236,974 B1
(45) Date of Patent: May 22, 2001

(54) METHOD AND APPARATUS FOR AUTOMATED SELECTION AND ORGANIZATION OF PRODUCTS INCLUDING MENUS

(75) Inventors: Adam K. Kolawa, Bradbury; Arthur Ray Hicken, Upland, both of CA (US)

(73) Assignee: Parasoft Corporation, Monrovia, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,146

(22) Filed: Aug. 7, 1998

Related U.S. Application Data (60) Provisional application No. 60/055,023, filed on Aug. 8, 1997.

(51) Int. Cl.[7] ........................................... G06F 17/60
(52) U.S. Cl. ..................... 705/7; 705/7; 706/52; 707/104
(58) Field of Search ................... 705/7, 26, 10, 705/27; 283/67; 706/52; 707/100, 104

(56) References Cited

U.S. PATENT DOCUMENTS

| | | | |
|---|---|---|---|
| 4,807,169 | * 2/1989 | Overbeck | 283/715 |
| 4,996,642 | 2/1991 | Hey | 364/419 |
| 5,583,763 | * 12/1996 | Atcheson et al. | 364/551.01 |
| 5,749,081 | 5/1998 | Whiteis | 707/102 |
| 5,884,282 | * 3/1999 | Robinson | 705/27 |
| 5,899,502 | * 5/1999 | Del Giorno | 283/60.2 |
| 5,960,440 | * 9/1999 | Brenner et al. | 707/104 |
| 5,963,948 | * 10/1999 | Shilcrat | 707/100 |
| 5,978,766 | * 11/1999 | Luciw | 705/1 |
| 5,979,757 | * 11/1999 | Tracy et al. | 235/383 |
| 5,999,975 | * 1/2000 | Kittaka et al. | 709/224 |
| 6,012,051 | * 1/2000 | Sammon et al. | 706/52 |
| 6,018,738 | * 1/2000 | Bresse et al. | 707/100 |
| 6,020,883 | * 2/2000 | Herz et al. | 345/327 |

FOREIGN PATENT DOCUMENTS

08063455 * 3/1996 (JP) ......................................... 15/20

OTHER PUBLICATIONS

Meals For You; The Best Recipe Site on the Web; http://www.mymenu.com/, 1996.*

An automated system for planning menus for the elederly in title VII nutrition programs, Unklesbay, N.; Unklesbay, K., Food Technology , 32 (8) 80–83, 1978.*

* cited by examiner

*Primary Examiner*—James P. Trammell
*Assistant Examiner*—Yehdega Retta
(74) *Attorney, Agent, or Firm*—Christie, Parker & Hale, LLP (57) ABSTRACT

An automatic maid performs all of the selection and organization tasks involved with family meal planning. The automatic maid keeps track of the needs and preferences of all users. User needs and preferences are constantly refined through questions about foods both eaten and rejected. The automatic maid keeps track of household inventory and can order additional supplies. The automatic maid uses the preferences of the users and its knowledge of the household inventory to select the most compatible meals. It gives instruction on food preparation, can activate appliances, and can order food. The automatic maid can be accessed from a remote location and can update its recipes over a network or the Internet.

20 Claims, 9 Drawing Sheets

METHOD AND APPARATUS FOR AUTOMATED SELECTION AND ORGANIZATION OF PRODUCTS INCLUDING MENUS

CROSS-REFERENCE TO RELATED APPLICATIONS

This application claims priority of provisional Application No. 60/055,023, filed on Aug. 8, 1997.

A portion of the disclosure of this patent document contains material which is subject to copyright protection. The copyright owner has no objection to the facsimile reproduction of the patent disclosure, as it appears in the Patent and Trademark Office patent files or records, by anyone, but otherwise reserves all copyright right whatsoever.

FIELD OF THE INVENTION

The present invention relates in general to a computer system for automatically selecting products for a user. More specifically, the invention relates to a computer system that will perform all of the selection and organization tasks involved with suggesting products to the user including menus for family meal planning.

BACKGROUND OF THE INVENTION

In today's environment most families consist of either two working spouses or a single working parent. As a consequence, at least one parent must come home from a long day at work and tackle the decision of what to make for dinner. Since the parent usually gets home from work around dinner time, the children and other family members are usually already hungry and tired. This situation often puts much stress on family members, in particular, the parent tasked with determining what meal to prepare (the primary care providing parent). The primary care providing parent is often pressured to prepare something quickly. Under this pressure, the parent opts most of the time for something simple and quick—if they have all the ingredients that they need to prepare the meal. If the parent does not have all the ingredients, he or she must make a trip to the store or figure out what they can make out of the ingredients at home. As a consequence of this situation, the family's menu is unimaginative. The family will therefore typically end up eating the same food over and over again, or the family will eat food from the same outside vendor (take-out).

The above problems would not exist if a maid is hired to perform the meal preparation task described. However, only wealthy families can afford the luxury of a maid. The above problems would also not exist if the primary care providing parent does not work. The stay-home-parent could select a meal, buy the necessary ingredients, and have the food prepared by the time everyone else in the family returned home. This solution may also not be feasible if both spouses enjoy their work and neither one wants to give up his or her career. Furthermore, in many situations, it may not be economically feasible to have only one parent working.

It is therefore desirable to have a system that allows for automated meal selection and shopping. Although actually cooking the meal requires some amount of work, the process of selection and shopping may actually be more time consuming and stressful. The system would also help with the cooking chores by providing detailed cooking instructions to the user.

Just as a good maid or a stay-at-home parent, the system would learn and adapt to the family's food preferences, and make the meal selections accordingly. In addition, just as a maid or stay-at-home parent, the system would also track what meals the family has eaten in the past to avoid needless repetition.

SUMMARY OF THE INVENTION

The present invention overcomes the problems with dual career families or single parent families by providing an automatic maid. The system performs all of the functions that are necessary for family meals except for the actual cooking and serving of the food which is the least complicated and time consuming part of the whole process.

An embodiment of the present invention provides a method for creating a user preference vector where the preference vector comprises a plurality of fields that represent specific user preferences. The method includes the steps of asking a predetermined question eliciting information about the user's preference for a product with a specific characteristic, and storing the user's response to the questions in a field in the preference vector corresponding to the specific characteristic.

The method of recommending a menu includes the steps of accessing a recipe for a menu, determining the suitability of the menu based on a comparison of characteristics of the recipe for the menu with user preferences obtained from the food preference vector, and recommending the menu to the user if the menu is found to be suitable.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION

Figure 1:
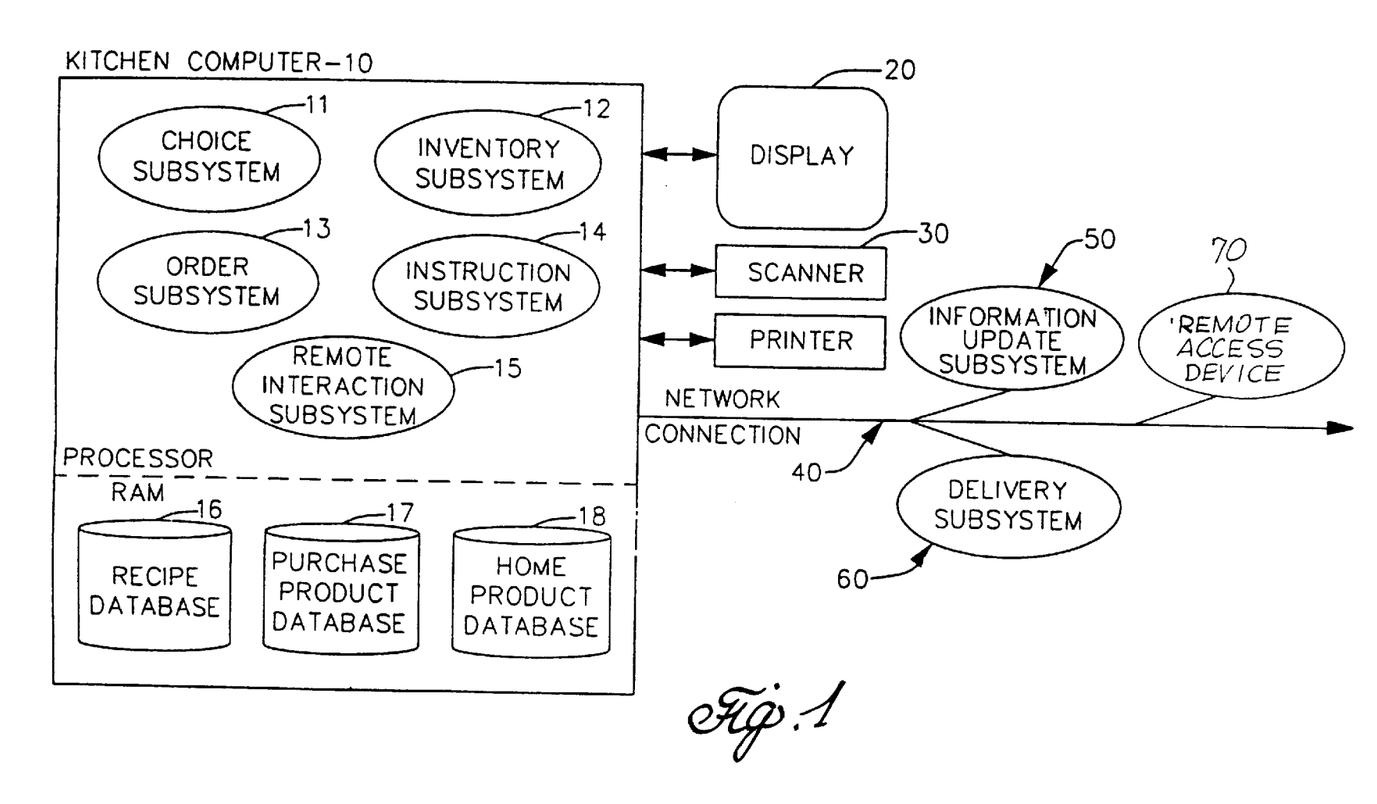
FIG. 1 is an exemplary block diagram of an automatic maid system in accordance with the present invention.

FIG. 1 is an exemplary block diagram of an automatic maid system in accordance with the present invention. The system consists of a kitchen computer 10, a display 20, an optional optical scanner 30, a network connection 40, an information update subsystem 50, a delivery subsystem 60, and a remote access device 70. The kitchen computer 10 contains a choice subsystem 11, an inventory subsystem 12, an order subsystem 13, an instruction subsystem 14, a remote interaction subsystem 15, a recipe database 16, a purchase product database 17, and a home product database 18. Each subsystem is described in further detail below.

In one embodiment of the invention, the kitchen computer 10 is mounted into a kitchen counter, cupboard, or appliance (such as a refrigerator), for easy access before or after a meal. Pressure sensitive (touch screen) technology is incorporated into the display 20 so that the user may interact with the system by simply touching certain portions of the screen. Alternatively, a numeric or alpha-numeric button or keypad arrangement, lightpen, or voice may be provided in combination with the display 20 in order to define an input device. The kitchen computer 10 should also have the capability to present multimedia presentations including sound and video.

The kitchen computer 10 is connected to three different types of computer systems existing outside the home via a network connection 40. These three systems are store servers, a remote control system, and information servers. In the described embodiment, the connection to these three systems is established via an Internet connection. Alternatively, network connection may be performed by a number of well known methods including LAN connection, RS-232 connection, R/F communication, and the like. The system may also be implemented on a stand-alone machine that is not connected to an outside network.

The outside connection to the information server allows the automatic maid to be updated with new information. The information server specifically contains information related to new recipes and other needed updates to the system. The information update subsystem 50 within the kitchen computer 10 functions to automatically update necessary information by using a push forward mechanism to push information from the information server to the kitchen computer 10. Typically, information from the information server will consist of new entries to place in the recipe database 16. Alternatively, the recipe database 16 may consist of only page references to known recipe books rather than storing the text of all the recipes. In such case, the information will relate to pages of new recipe books available to the public.

Other information provided by the information server can consist of new classifications for the menus themselves. The information server may also consist of updated software for the system. The outside connection may also allow families to search the Internet for new recipes.

The system communicates over the network to the remote control system via the remote access device 70. The remote control system can be implemented as a program running on a remote computer that can connect to the network. Typical implementation of the remote control system will be programs running on a computer in the work environment. In this way, someone can communicate through his or her work computer with the automated maid system. Instructions to the automatic maid from a remote location may also be given through voice recognition over a phone, by key selection from a touch tone phone, or through an Internet browser linking to the automatic maid. The remote interaction subsystem 15 in the kitchen computer 10 operates with the remote access device 70 to allow for remote control of the system. The remote interaction subsystem 15 is described in further detail below.

If the system is configured to operate in automatic delivery mode, the system will connect to a store server. Store servers receive orders from the home portion of the system via the order subsystem 13 and send those orders to the delivery subsystem 60. There may be one or multiple store servers. These store servers can be located in one or multiple stores and these stores can belong to different companies. Thus, the automatic maid can price-shop online to obtain the lowest prices of needed items.

In general, store servers are implemented as computers that are connected to the network. The request for the sale of products is received through the connection. The request is then analyzed and compared to the database of available products in the store. The products selected are then assembled and prepared for delivery. It is not important how the store server interacts with the store computer system. It can interact through the use of store employees who key-in products to sell or it can interact by having a direct connection to the store computer. The purchased products are then added to the list of products which a delivery service will either deliver to the home or that will be stored waiting for someone to pick up.

Choice Subsystem

The choice subsystem (CS) 11 emulates a good maid or a stay-at-home parent. A good maid knows the family well, including details about the family's dietary needs and preferences. For instance, a good maid knows if someone in the family is a vegetarian, or whether the children have particular foods that they like or dislike. A maid can thus correlate family food preferences to cooking recipes to ensure that a satisfactory meal is prepared each time. Family members, therefore, can avoid the stressful task of choosing a menu that is both innovative and appealing to the family. This results in great improvement to the family's standard of living.

The automatic maid system performs the meal selection function through the choice subsystem 11. The function of the CS 11 is to keep a family food preference vector and constantly update it as the CS 11 learns about the family's food preferences. As the system proposes a menu for the family, the family rejects or accepts the menu and gives feedback as to the rejection or acceptance. Thus, with each usage of the system, the CS is able to learn and adapt to family tastes. The trial and error process undergone by the system is therefore no different than the process that a new maid undergoes. This is explained in further detail below in conjunction with FIG. 4.

In one embodiment of the present invention, the CS 11 utilizes a knowledge database to adjust to family preferences. By means of this knowledge database, the system stores family preferences and matches them with cooking recipes. In the described embodiment, family preferences are represented as a vector of numbers. Each position in the vector represents a different preference. The positions in the vector can be of two different types. The first type of positions are exclusive positions. These positions represent a preference that absolutely needs to be present in the recipe that is ultimately selected by the system. For example, if an exclusive position in the preference vector indicates that the family is vegetarian, the recipe selected must be a vegetarian recipe.

Figure 2:
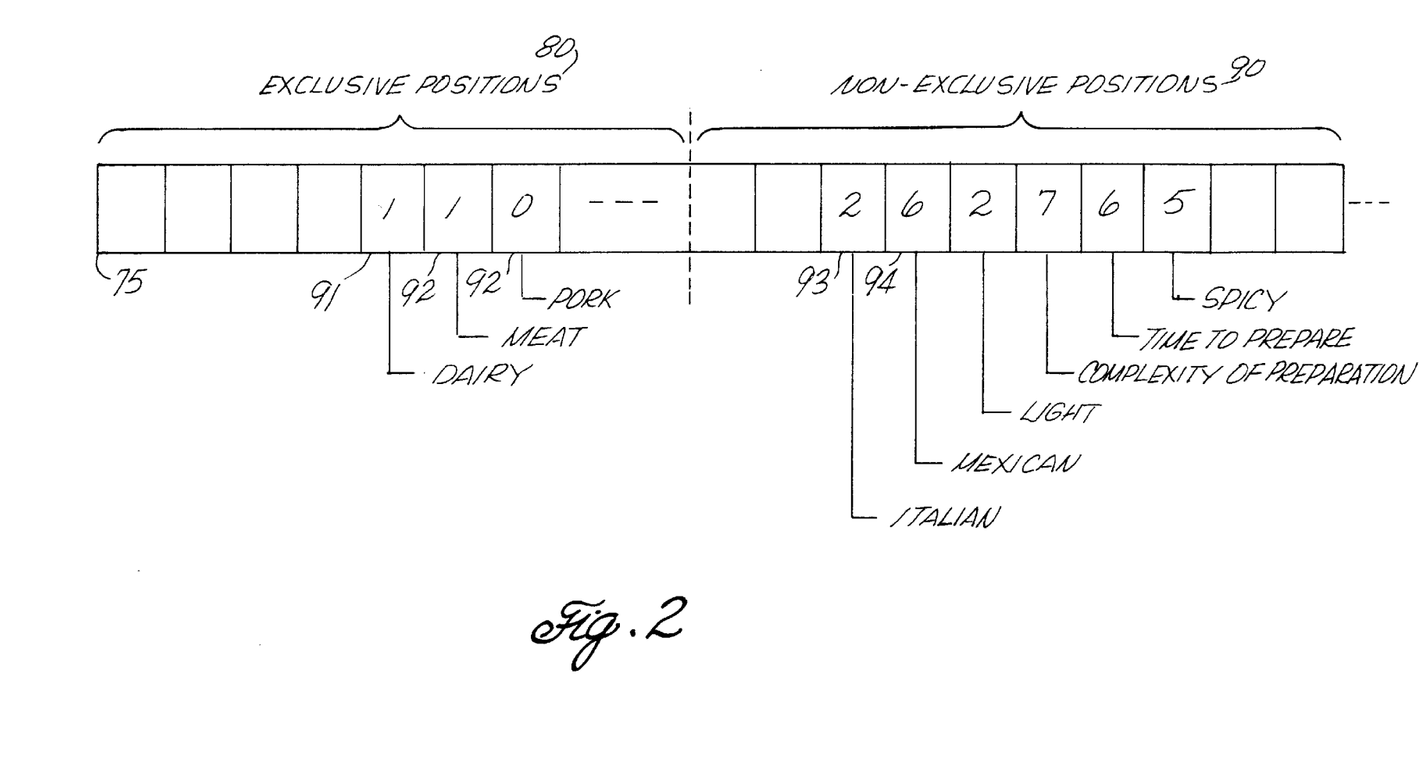
FIG. 2 is an exemplary data structure for containing family preferences (a family food preference vector) in accordance with an embodiment of the present invention.

The second group of preferences is nonexclusive. These preferences measure how preferable something is to the family. These positions contain a number on a scale of one to ten. This scale, however, could be modified to provide more or less granularity. Furthermore, certain nonexclusive preferences may be given higher weight in a comparison to others. The higher the number on the scale of one to ten, the more likely the preference will match the family's preferences. A typical family food preference vector 75 is shown in FIG. 2. Exclusive positions 80 are set to a "0" or "1" for each exclusive category. Non-exclusive positions 90 are set to a value between 1 and 10.

Although the preference vector in the described embodiment is used for food preferences, it will become readily apparent to a person skilled in the art that the preference vector may be extended for use in other types of expert systems. For instance, similar preference vectors may be used by a psychologist or a physician trying to diagnose a patient's illness by matching a patient's symptoms with a particular illness. Preference vectors may also be utilized by retail stores to keep track of the buying preferences of their customers. Knowledge of such preferences will allow these stores better cater to the customers' needs.

The particular fields of a preference vector are specified via a setup GUI. A system programmer running the setup GUI defines preference vector questions and specifies the fields of the preference vector to which the questions relate. The system programmer may further specify where the preference vectors are stored. For instance, the preference vectors may be stored at an offside server along with a unique ID. When access to a particular preference vector is desired, the user may do so by simply submitting the request via the network along with the ID of the desired preference vector.

Figure 6:
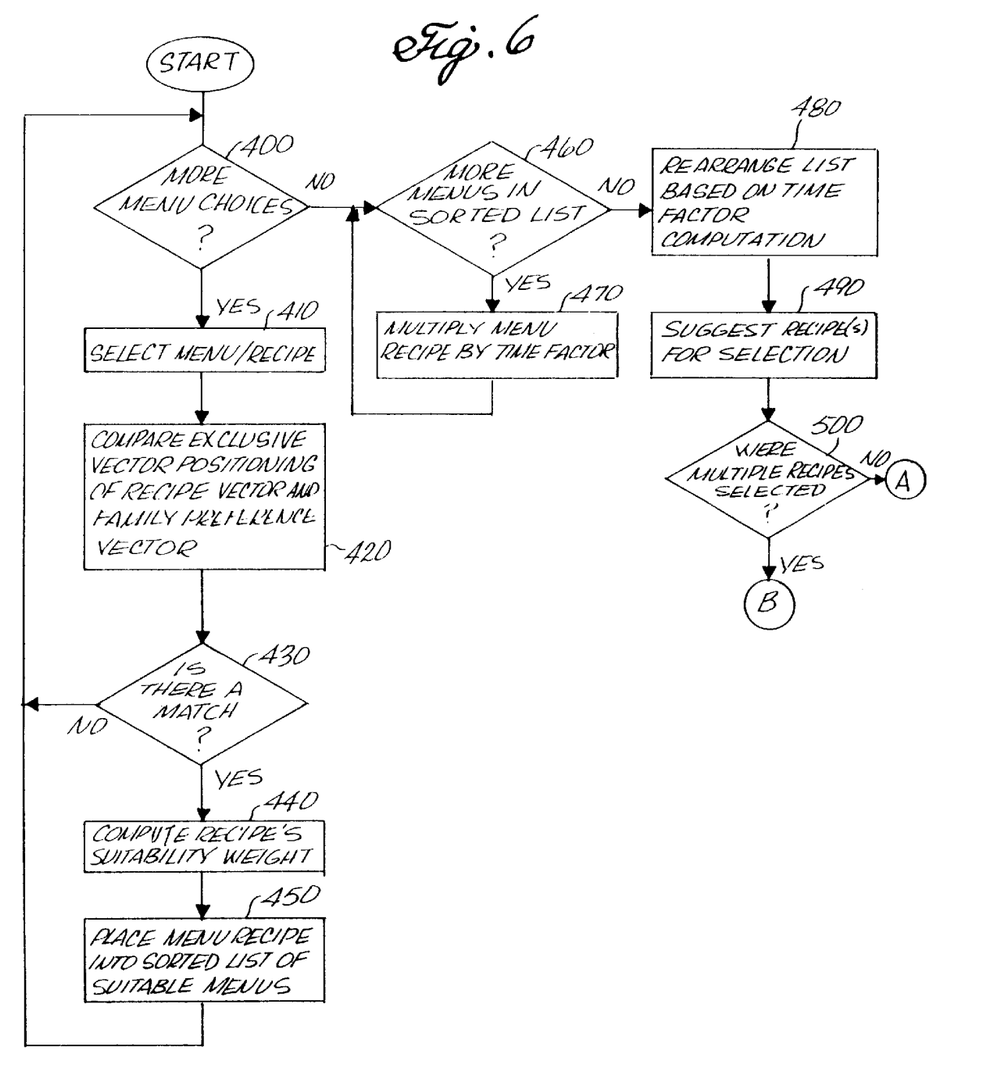
FIG. 6 is an exemplary flow chart of a process for determining if a menu is suitable for recommendation according to an embodiment of the present invention.

The CS 11 in the described embodiment works in conjunction with a recipe database 16. The recipe database 16 contains numerous recipes for family meals. Corresponding to each recipe is a recipe vector. The recipe vector characterizes the recipe so that it can be compared to the family food preference vector for selection, as is explained in further detail below in conjunction with FIGS. 6A–6C.

The recipe vector is analogous to a family food preference vector 75. Specifically, each position in the vector has the same meaning as the analogous position in the family food preference vector 75. A vector of numbers representing characteristics of the meal is stored along with each of the recipes in the database. This vector is set once for a recipe and does not change. When new recipe data is loaded into the system, a recipe vector is created for the recipe so that it can be matched up with the family's preferences.

In another embodiment, instead of the recipe database 16 maintaining the actual copies of recipes, it refers to the page number of existing recipe books. In yet another embodiment, the recipe database may act in conjunction with an Internet browser to allow the user to access recipes via the World Wide Web.

Figure 3A:
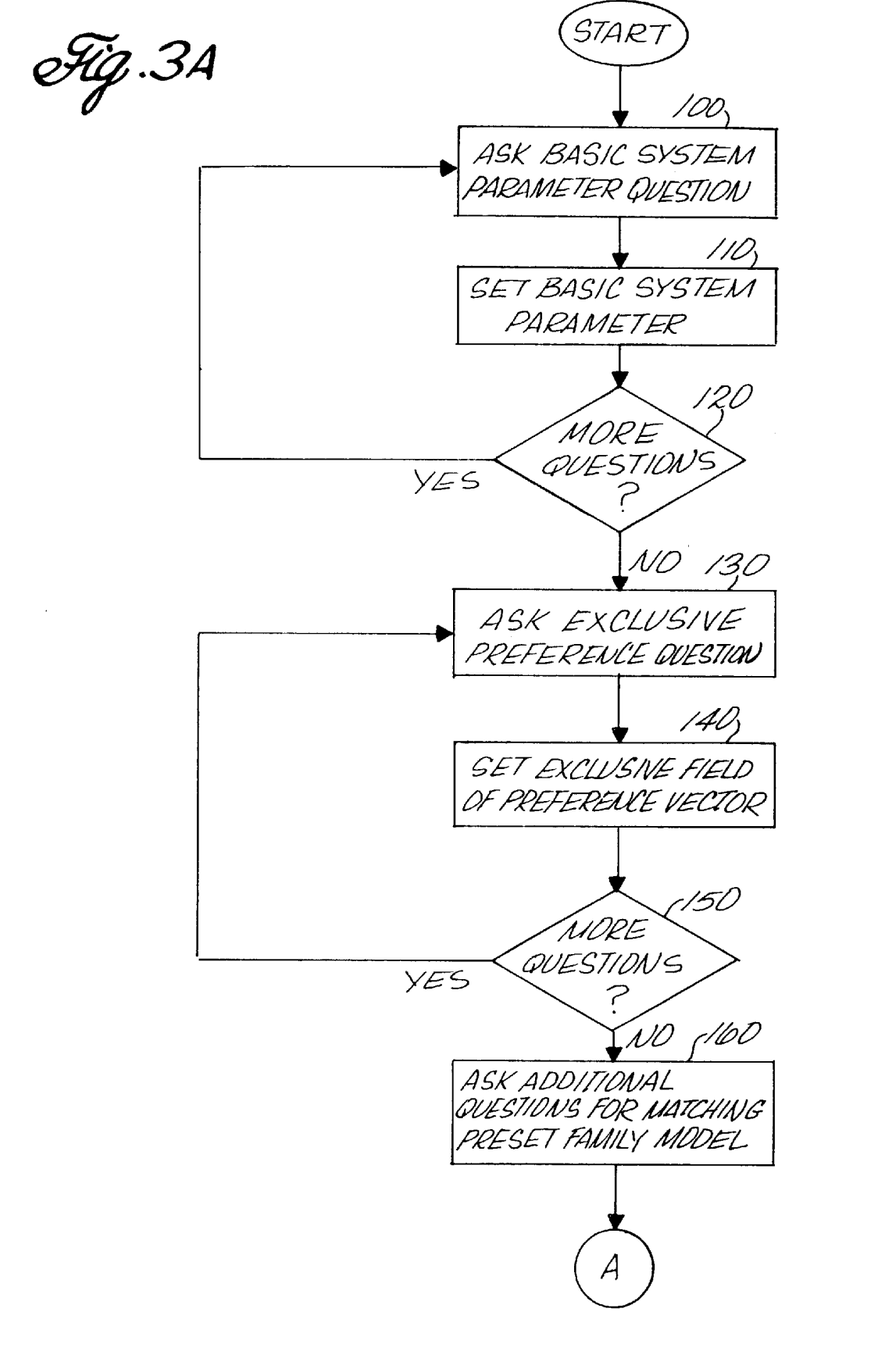
FIGS. 3A–3B are exemplary flow charts of a process for creating the family food preference vector of FIG. 2.
Figure 3B:
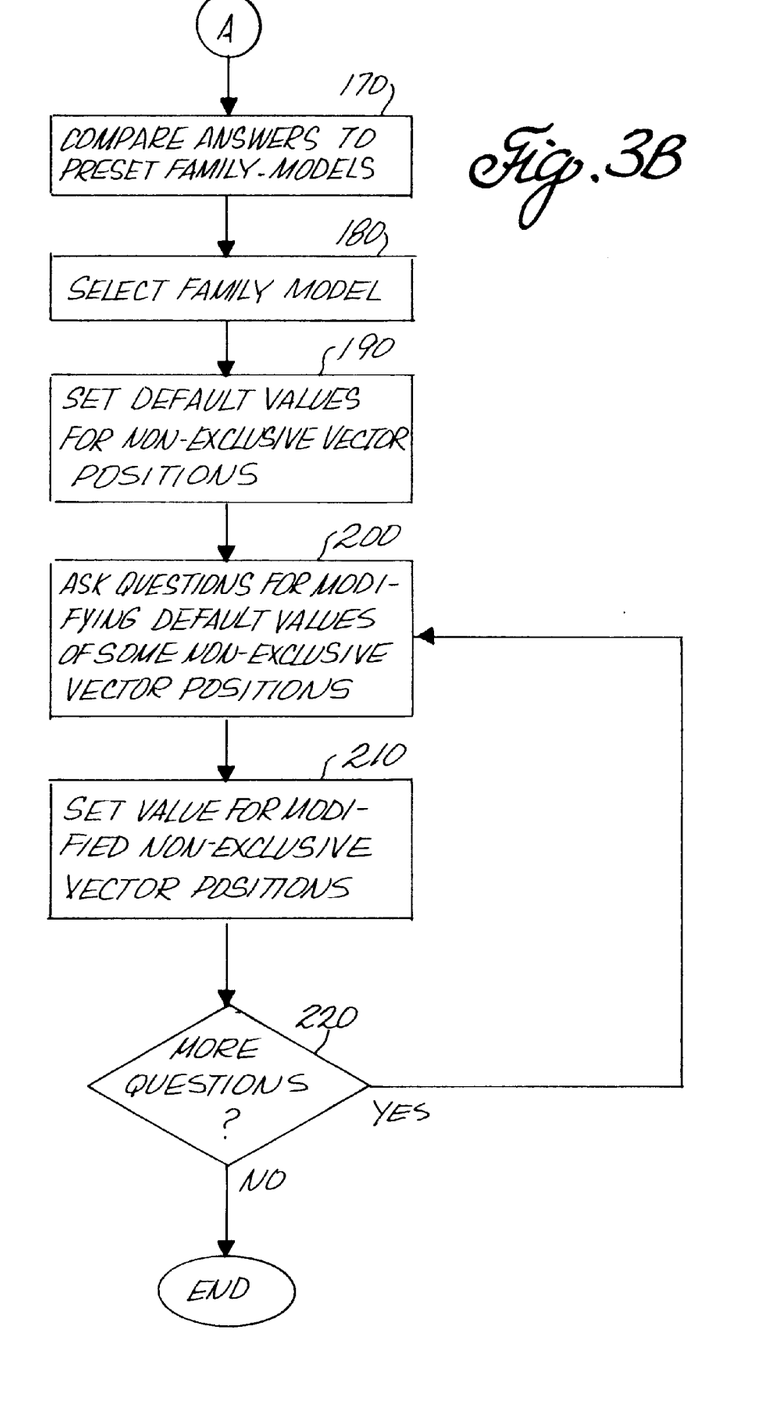

FIGS. 3A–3B are generalized flow diagrams of the family food preference vector initialization process according to an embodiment of the present invention. Interaction between a user and the system occurs during runtime GUI.

When the system is first used, the CS 11 asks preliminary questions which allow it to both classify the family into one of the preset family models and obtain the family's general preferences for an initial setting of values of the family preference vector 75. The process starts by asking a basic system parameter question in step 100. A system parameter question may relate to any of the following: the number of family members, their ages, weights, and sexes; the number of meals to plan; the time when meals should be ready; the amount of time the family wants to spend preparing food; the number of times per week the family wishes to get take-out food; the food budget; and whether the family would rather minimize the number of shopping trips taken or the amount of food in the home.

In step 110, the process sets the system parameter according to the user response to the question of step 100. In step 120, the process determines whether all the system parameter questions have been asked. If they have not, the process loops back to step 110 and the next system parameter question is asked.

When all the system parameter questions have been asked and answered, the process, in step 130, asks an exclusive preference question. In the described embodiment, exclusive preference questions relate to the kinds of foods that the family should avoid. For instance, the question may elicit information as to particular food items, such as meat, pork, lamb, or veal, that are to be avoided. The question may also relate to particular meal ingredients to avoid, such as salt, pepper, dairy products, egg yolks, or milk. The user response to the question is used in step 140 to set the corresponding exclusive field (position) in the preference vector 75. For instance, the fifth position of the preference vector 75 shown in FIG. 2 is set to "1", signifying that dairy products may be included in the family's meals. On the other hand, the seventh position of preference vector 75 is set to "0", signifying that pork is to be excluded from the family's meals.

The process determines in step 150 whether there are more exclusive preference questions to ask. If there are, the process loops back to step 130 where the next exclusive preference question is asked.

When all the exclusive preference questions have been asked and answered, the process, in step 160 asks additional questions to help choose an appropriate family model for setting the default nonexclusive vector position values. Such questions may inquire, for example, whether more than one person will be doing the cooking, or whether the family is adventurous and willing to try a great variety of different foods.

After all the family model questions have been asked and answered, the process, in step 170, takes the answers given to the basic parameter questions, the exclusive preference questions, and the additional family model questions, and compares them to the attributes of various preset family models to select the family model which best characterizes the user's family. The different family models may include:

1) Working Family with Children—characterized by moderate eating, desiring to dine out occasionally, cooking in the home most of the time, little time to cook, enjoys cooking on weekends.
2) Individual—characterized by mostly eating out, cooking only simple dishes.
3) Family with One Parent Not Working—characterized by cooking most of the time.
4) Young Two Member Family—characterized by mostly eating out and cooking occasionally for fun.
5) Experimentalist—characterized by wanting to try new food all of the time.

In one embodiment of the invention, the matching of a family model to the user's family is accomplished by representing the attributes of each family model as a preset preference vector. The answers provided by the user to the basic parameter questions, the exclusive preference questions, and the additional family model questions are represented as a temporary preference vector. The temporary preference vector is compared against the preset preference vectors representing each family model. In step 180, the process selects the family model that most closely matches the current family. The preset preference vector representing the chosen family model is then utilized in step 190 to set the default values of the family preference vector's 75 nonexclusive positions.

Once the default values have been set, the process in step 200 asks questions for modifying the family food preference vector. The answers to these questions are used in step 210 to modify the default values of some of the non-exclusive positions to better represent the preferences of the user's family. The question may relate to the physical health conditions of the family members. For example, the question may be one of the following: "Are any family members diabetic?"; "Are any family members on a low cholesterol diet?"; "Do any family members have a heart condition?"; "Are any of the family members trying to gain weight?"; "Are any of the family members trying to lose weight?" These questions typically will be designed by a physician.

Questions may also be asked about the type of food that the family likes. For instance, the user may be presented with various types of foods, such as Italian, French, Mexican, Chinese, Japanese, Mediterranean, etc., with instructions to rank the family's preference on a scale of one to ten. For example, the family food preference vector 75 of FIG. 2 illustrates a family that prefers Mexican food over Italian food. The Italian food preference field 93 is set to "2" whereas the Mexican food preference field 94 is set as "6". Additional questions in this area may be designed with the help of a psychologist.

Questions may also be asked about the family's eating preferences in general. These questions may include: "What is the most important quality of a good meal?"; "The amount of food?"; "The flavor of the food?"; "The preparation time?"; "Does the family like salads?"; "Does the family like appetizers?"; "Does the family like sandwiches?"; "Does the family like snacks?"; "Does the family like to eat out?"; "Does the family like to eat on the run?"; "Does the family like deserts?"; "Does the family like wine with dinner?"

In step 220, the process determines whether all the questions for modifying default values of certain nonexclusive vector positions have been asked. If all the questions have been asked and answered, the initial family food preference vector 75 is complete and the process ends.

The initial food preference vector 75 is used by the CS 11 to propose an initial menu for the family. As the family uses the system over time, the CS learns and adapts to family tastes via trial and error as discussed in further detail below in conjunction with FIGS. 5 and 6. The trial and error process undergone by the system is similar to the process that a new maid undergoes.

Figure 4:
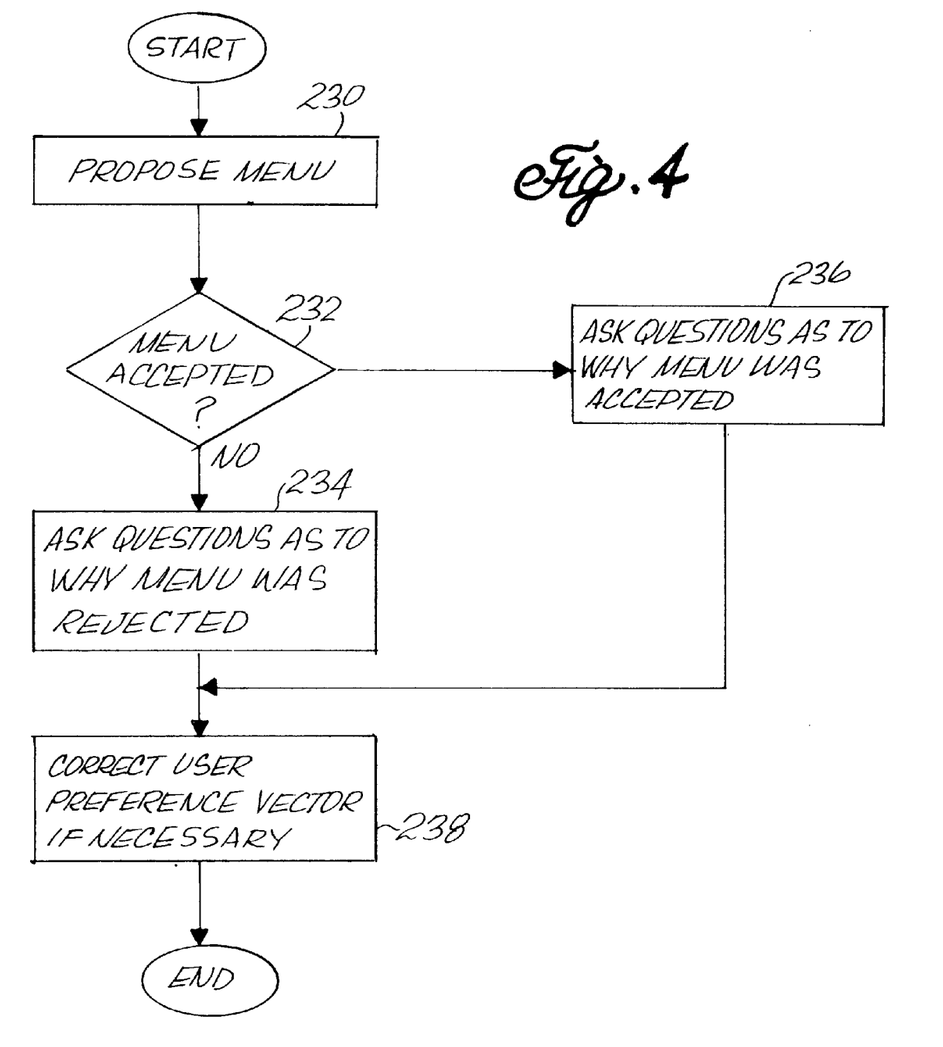
FIG. 4 is an exemplary flow chart of a process for learning and adapting to family preferences in accordance with an embodiment of the present invention.

FIG. 4 illustrates the learning and adaptation process that the system undergoes according to one embodiment of the invention. In step 230, the process proposes an initial menu for the family. In step 232, the user may either accept or reject the proposed menu. If the menu was rejected, the process in step 234 asks questions to ascertain why the menu was rejected. Similarly, if the menu was accepted, the process in step 238, asks questions to ascertain why the menu was rejected. In step 238, the family food preference vector 75 is corrected if necessary and used for future choices based on the answers to these questions.

Figure 5:
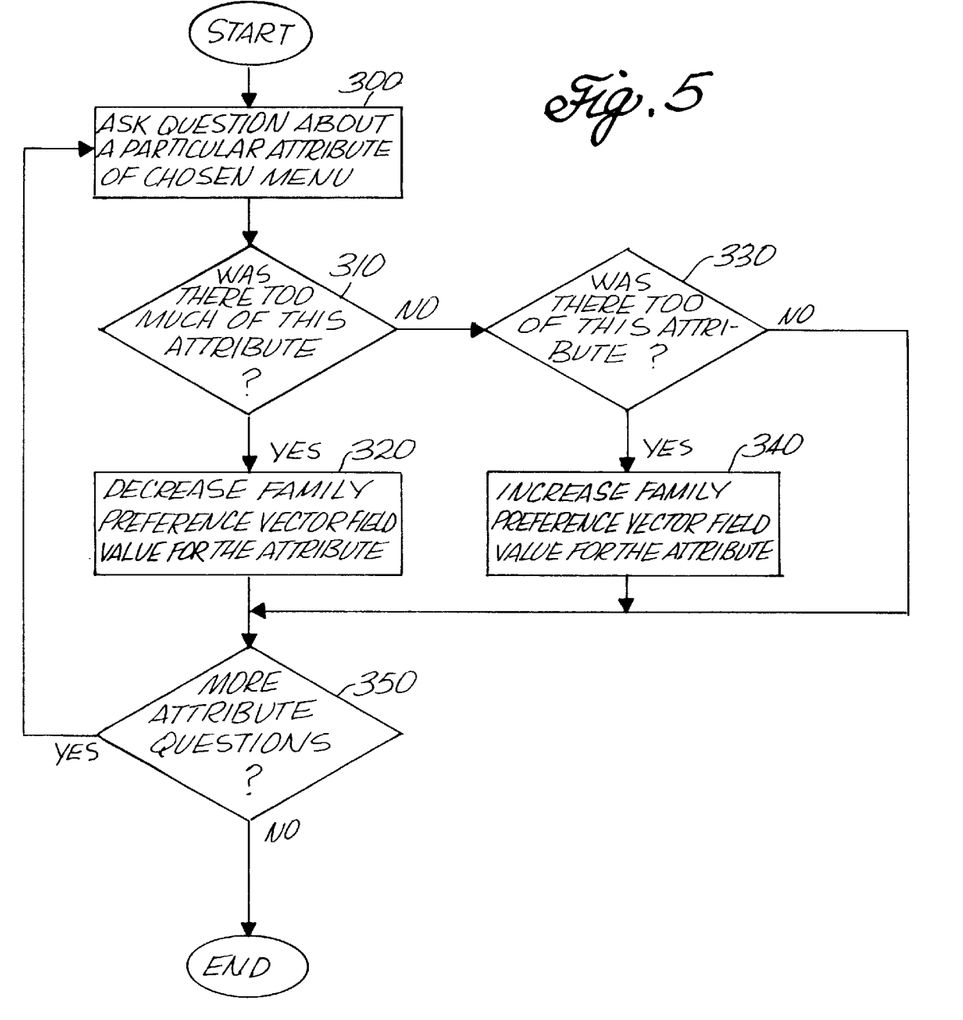
FIG. 5 is an exemplary flow chart of the steps for updating the family food preference vector of FIG. 2.

FIG. 5 illustrates the process for further updating the family food preference vector after a meal has been consumed. The process begins and in step 300 asks a question about a particular attribute of the chosen menu. Examples of such questions include: "Did you like the meal?"; "What did you like most? Taste? Amount of preparation required?"; "Which ingredients did you like or dislike?"; "How should the meal have been changed? Less salty? Lighter?"; and "Was there enough food?"

Based on the user response, the process in step 310 determines whether there was too much of the inquired attribute in the menu. If there was, the family's preference vector field value for that attribute is decreased in step 320. Likewise, if process determines in step 320 that there was too much of the inquired attribute in the menu, then the family's preference vector field value for that attribute is increased in step 340. For example, if the menu was too salty, the value of the field in the family food preference vector 75 representing the family's preferred saltiness would be decreased below the value in the corresponding field of the recipe vector.

FIG. 6 illustrates a process for determining if a menu is suitable for recommendation according to an embodiment of the present invention. The process begins and in step 400 it inquires whether there are any menu choices to suggest to the user. If there are, a first menu (recipe) is selected in step 410. In step 420, the exclusive vector positions of the recipe vector is compared against the exclusive vector positions of the family food preference vector. The recipe, in order to be accepted by the system for the family in step 430, must have all exclusive positions set to the same value as those positions in the family preferences vector. If one of the exclusive positions does not match, then the recipe is rejected. If all of the exclusive positions match, the rest of the positions in the vector (the nonexclusive positions) are used in step 440 to calculate the suitability weight. The weight is a scalar product of the nonexclusive fields 90 of the family food preference vector 75 and the recipe vector. The resulting number represents how well the menu matches with the family preferences. The higher the number, the better the match. For example, a recipe that was closer to the family's preferences in terms of things such as how spicy the food is, how long it takes to prepare, how complicated it is to prepare, how much it costs to prepare, etc., would receive a higher number upon comparison, than a recipe that was more distant from the family's preferences.

In step 450, the menu with the calculated suitability weight is placed into a sorted list of suitable menus, and the process loops back to step 400 to determine whether there are any more menu choices to consider.

This type of vector comparison can be used in the other types of expert systems described above. For example, a psychologist trying to diagnose a patient could input many of the patient's characteristics, and the system would compare those characteristics to those that have been detailed for traits and disorders in order to find the best match. Similarly, a medical doctor trying to diagnose a patient could input the patient's symptoms into this type of system. The symptoms could be standardized into some type of vector and that vector could be compared with the vectors of possible diseases to find the most likely cause of the symptoms. It may also be possible to sell music or other entertainment products through the use of vector comparison. A person's tastes or interests could be compared to those attributes of the product in question to ascertain whether the person may be interested in purchasing the product.

Once the vector comparison numbers are calculated and the recipes are arranged in a list, a further calculation is performed on each menu in the sorted list. This is achieved by the process first asking in step 460 whether or not there are any more menus in the sorted list to perform a calculation on. If there are, the current recipe in the list is multiplied by a time factor in step 470. This process continues until all the recipes in the list have been multiplied by the time factor. The time factor prevents menus from being used too often. The time factor changes from zero to a value between zero and one and works as follows. The system remembers when the recipe was last used. The system has a standard number of days after within which the recipe can be used again. If the recipe has not been used within this time, then the time factor is one. Otherwise, the time factor is a fraction of one. For example, the system can be set up so that the standard number of days is ten. If a menu has not been used within ten days its time factor will be one. If the menu was used five days ago its time factor will be 0.5. The list then is rearranged in step 480 based on the time factor computation.

The process, in step 490, then provides several choices of recipes for a specific day. If the family wants to see the choices, a picture and detailed description of each recipe can be shown as well as its nutritional information. In step 500, the family can choose a particular recipe to be the meal, or the family can let the system choose a menu from the compiled list. In the initial phase of the system, user selection or rejection of a menu causes the preference vector update process of FIG. 4 to be implemented. Furthermore, after a meal has been consumed, the preference vector is further updated as described in conjunction with FIG. 5. After a reasonably short period of time, the system will be able to generate a menu for the family that will be acceptable on a consistent basis.

A C++ language implementation of a generalized code for preference vector creation and matching is disclosed in Appendix A.

Order Subsystem

Figure 7A:
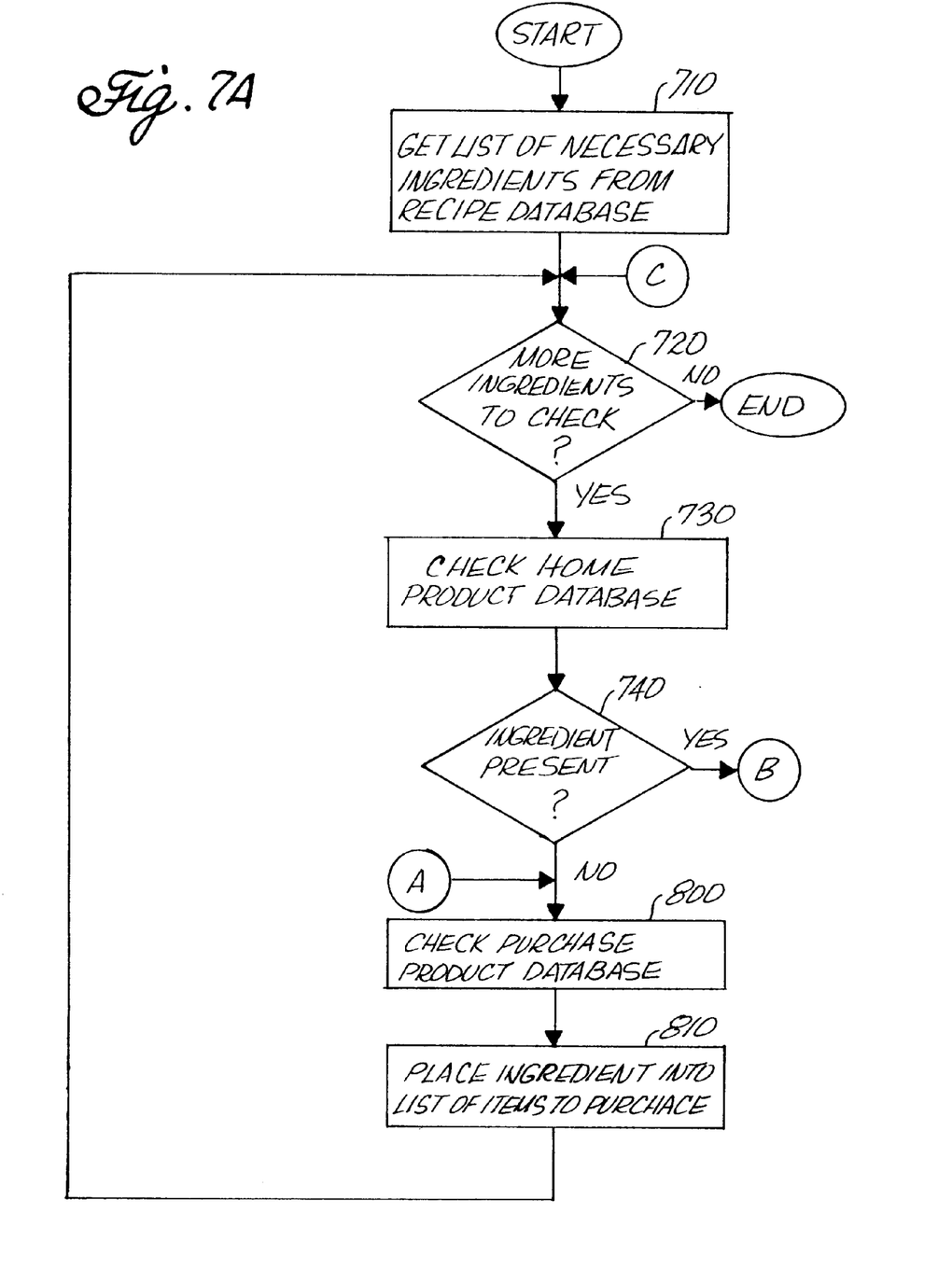
FIGS. 7A–7B are exemplary flow charts of a process for determining the ingredients that need to be purchased once a user selects a suggested menu.
Figure 7B:
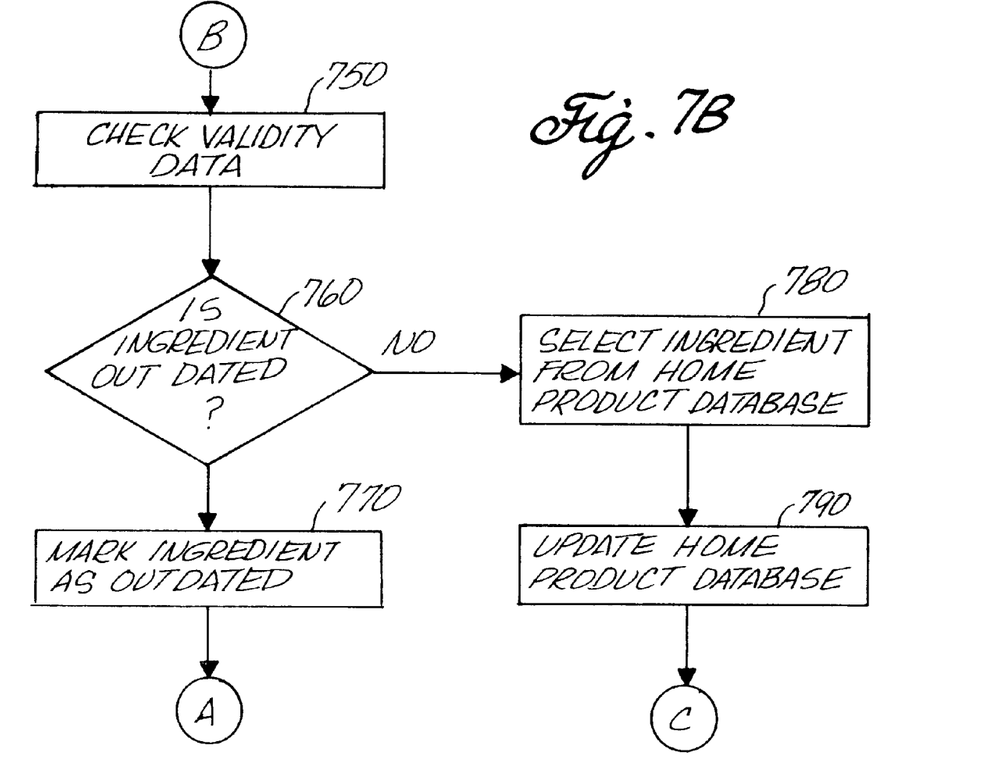

FIGS. 7A–7B are exemplary flow charts of a process for determining the ingredients that need to be purchased once a user selects a suggested menu. In step 710, the process checks the recipe database 16 (FIG. 1) to determine the necessary food ingredients for the chosen menu as well as the quantity of each ingredient. This information is then correlated with two databases. In step 720, process determines whether all the ingredients have been checked. If there are more ingredients to check, the home product database 18 is checked first in step 730, and in step 740, the process inquires whether the ingredient is in the home product database, indicating that the ingredient is already present in the user's home.

If the ingredient is in the home product database, its validity date is checked in step 750. The system makes sure that only ingredients that are still valid can be used. If any of the ingredients are outdated, the process marks them in step 770. If the ingredient is to be discarded, the process checks the purchase product database 17 in step 800 to determine if the product is available for purchase. This database can be local or remote. For example, it can be a database of products that are available at local supermarkets or products that are available over a computer network. Within the home product database 18 and the purchase product database 17, each product will have a description and information concerning the validity date, the quantity of the product per container and the time when the product will expire once the container is opened. In general, most of the information available on a product label will be available within the purchase product database 17.

In addition, if the system has access to multiple product databases, the system can perform price optimization by selecting the product database with the cheapest price for the ingredient. This function is particularly important if the family is on a strict budget.

Once comparisons are made to the home product database and the purchase product database, the process in step 810 places the ingredient into the list of items to purchase. The system can then either send a request to buy these products over the network or it can print out a shopping list.

The menu selection process and shopping list creation may occur on a daily, weekly or monthly basis. For example, they system suggest the menu for the whole week. If the user accepts the menu, the system will then generate a list of needed products. In this way, a user needs to go shopping only once a week. Alternatively, the system can select a recipe on a daily basis and then print out the needed ingredients for a daily trip to the store.

The procedure described so far applies in the case where the user selects only a single recipe from the recipes suggested by the system. If, on the other hand, the user selects multiple recipes, each recipe is checked against the home product database 18 to determine if they can be prepared from the products already in the house. If one of the choices can be prepared from products already in the house, this menu is chosen to be the menu of the day.

The other choices are also analyzed for needed products. The list of needed products is created and is either sent to the ordering system which sends it to the store server or printed out for the family member to use on a shopping trip.

Once the menu is chosen and products are in place to prepare the menu, the system is ready to give cooking instructions. The system can also act on instructions remotely. For instance, the family can leave home in the morning and before leaving, choose pizza for dinner. The system can order pizza from a pizza delivery store or the system can start the oven to cook a pizza if the family puts the pizza in the oven before leaving. The system can also give instructions on how to prepare pizza to the family. If this is the case, the system can display instructions or give a multimedia presentation via the video screen. All of these options can be overridden by the remote interaction subsystem 15, described in further detail below.

The Delivery Subsystem

The delivery subsystem exists remote from the kitchen computer. It is typically connected to the network and can receive orders from the order subsystem to purchase meal ingredients. The delivery subsystem can be affiliated with a grocery store or it can be a warehouse system that only sells goods via a computer network. With the addition of the delivery subsystem, the automatic maid can be completely automatic so that products are automatically delivered to the home and the home products database is automatically updated. This mode is preferable as the work required by a family member is kept to a minimum.

Instruction Subsystem

Before every meal, family members will be presented with explicit instructions on how to prepare the food. The complexity level of the instructions will vary depending on the meal that is selected. For example, a simple meal such as macaroni and cheese will require relatively simple instructions, whereas a complicated meal such as a souffle may require more detailed instructions. In some cases multimedia will be used to instruct a family member in how to prepare food. This will typically include written instructions and a video/audio presentation on preparing the meal. In other cases, references to cookbooks will be made for the user to look up the instructions in the specified cookbook.

If the system decides that the best menu selection is to call for take-out food, the instructions will consist of a telephone number for a restaurant and instructions on the specific food items to order from this restaurant. The instruction subsystem may also be configured in an automatic mode so that it can automatically call a take-out restaurant and order food for delivery at a specific time.

Inventory Control Subsystem

The complexity of the inventory control subsystem depends on the kind of delivery service that has been chosen.

If an automated delivery service with an electronic network connection between the delivery service database and the home products database is in place, the inventory control may be fully automated. In such situations, information on the delivery of products is automatically transferred to the inventory control subsystem. If no such automated means exist, inventory control is performed upon delivery of the product to the user's home by either manually entering the delivered items into the home products database, or scanning the Universal Product Code (UPC) of the products via the UPC scanner 30.

Even in automated situations, it is desirable to manually reconfirm the purchased products in the home products database since there will always be the possibility of some type of error. The reconfirmation process can be performed in different ways. In general, it amounts to inputting information about delivered products into the system. This can be done electronically using a UPC scanner 30 or by keying information into a touch screen display 20.

As ingredients are used for meal preparations, the system keeps track of how much of each ingredient has been used. For example if a recipe calls for two eggs, the system subtracts two from the amount of eggs that remain in an egg carton. This method of keeping inventory requires some feedback from the family. For instance, if a user decides to discard a product, he or she should notify the inventory subsystem 12 so that it can be subtracted from the home product database 18. Such notification may be accomplished by scanning the product label via the UPC scanner 30 before the product is discarded, or simply keying in the information into the system via the touch screen display 20.

When the level of quantity in a particular ingredient package gets to a level that is too low to be used in any known recipe, the system asks the user to choose between discarding the package or using it as part of a new meal.

The inventory subsystem 12 further keeps track of validity dates of stored products. If a product is purchased with a pre-marked expiration date, this date is monitored to determine if a product should be discarded or not. If a product does not come with a pre-marked expiration date, the system assigns an expiration date based on the type or category of products. For instance, all leafy vegetables will have one kind of validity date whereas all types of non-leafy vegetables will have a different kind of validity date.

If the validity date or expiration date of the product has passed, the system asks the user if the product should be discarded or kept for a specific number of additional days. If the product is quickly perishable, such as fish, the system may not allow the user to extend the validity date due to health risks. If an extension is allowed, the inventory subsystem 12 will advice the user as to the types of health risks involved.

The inventory subsystem 12 also performs periodic inventory checks of the products in the home product database 18. The user may select the time period in which to perform the inventory process. During this process, the inventory subsystem 12 lists all of the products that are stored in the home product database 18 and asks for confirmation of the amount that is stored for each product. The quantity of each product is then updated.

The inventory subsystem 12 tries to optimize the amount of food stored in the house. It ensures that only a minimal amount of food is stored. The inventory subsystem 12 will, however, have options to store and monitor food supplies for emergency reasons. For instance, the inventory subsystem 12 can monitor food and water supplies needed for the family in the case of an earthquake.

Remote Interaction Subsystem

The remote interaction subsystem 15 allows the automatic maid to be accessed from a remote location and be instructed to change a menu for a specific day. This may occur for example because a family may have a visitor who desires a certain menu or who has certain restrictions on what he or she can eat. This function again is very similar to a function that would be performed by an actual maid. A maid can be called and instructed about a change of plans or be given extra instructions. Similarly, the automatic maid with a network connection 40 can be instructed to change or adjust a selected menu. Instructions to the automatic maid from a remote location may be given through voice recognition over a phone, by key selection from a touch tone phone, or through an Internet browser linking to the automatic maid.

If the home product database 18 does not have the ingredients needed for the new or modified menu, the automatic maid is connected in automatic delivery mode to allow it to order the needed ingredients or order food from a restaurant.

The automatic maid can further be connected to kitchen appliances so that it can perform additional functions. For example, the system can instruct the oven to preheat to a certain temperature. The user may give this instruction in the morning before leaving the home or may provide the instruction by remote control via the network connection 40.

Accordingly, the present invention provides an apparatus and method for automated selection of menus. Although this invention has been described in the embodiment of a menu selection system, many additional modifications and variations would be apparent to those skilled in the art. It is therefore to be understood that this invention may be practiced otherwise than is specifically described. For instance, the system may be extended to other types of knowledge based selection systems where products are recommended based on the knowledge of the user's preferences. Thus, the present embodiments of the invention should be considered in all respects as illustrative and not restricted, the scope of the invention to be indicated by the appended claims rather than the foregoing description. The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

APPENDIX

```
#include "vector.hh"
#include <stdio.h>
#include <stdlib.h>
#include <fstream.h>
static PERSON *user[128];
static int user_count = 0;
static DISH *food[128];         //vector for each product
static int food_count=0;        //number of products
static int vector_size;         //number of items in vector
static int max_preference=9;    //each preference in vector is in the
                                  range 0..9
static int range=9;             //user input is between 0 and range
static int xsize;               //size of exclusive part of vector
        //gets user evaluation of product and
        calculates user preference vector
int taste_dish(int id, int dish)
{
float factor = 1./(range+1);
int i;
int diff;
int rating, srating;   //rating of product and scaled rating
```

APPENDIX-continued

```
int midrange; //midway between 0 and range
printf("\nget rating in the range from 0 to %d:", range);
    scanf("%d",&rating);
midrange= range/2;
factor = (factor * rating - .5)* 2;      //make factor a number between
                                           −1 and 1
            for(i=0;i<vector_size; i++) {
                diff = (food[dish]->taste[i] - user[id]->taste[i]);
                if(diff < 2 && rating <= midrange+1) {   //bad rating
                of product
                    if(user[id]->taste[i] < midrange)
                        user[id]->taste[i] =
                        max_preference-rating*
                        (max_preference-user[id]->taste[i])
                        /max_preference;
                    else
                        user[id]->taste[i]=rating*
                            (user[id]->taste[i]/(float) (range-1));
                }
                else
                if (rating == 9) user[id]->taste[i] = food[dish[->taste[i];
                else user[id]->taste[i] += diff * factor;
                if(user[id]->taste[i] < 0)
                    user[id]->taste[i] = 0;
                if(user[id]->taste[i] >= range)
                    user[id]->taste[i] = range;
            }
            printf("user vector: ");
            for (int ind = 0 ; ind < vector_size+xsize; ind++)
                printf(" %d ", user[id]->taste[ind]);
            printf("\n");
}
                //choose product that matches our preferences
int find_dish(int id)
{
int max = 10000; int d_id = 0;
int i;
int ret,dret;
int bad_choice=0;
            for(i=0; i<food_count;i++) {
                if(food[i]->chosen) {
                    food[i]->chosen -=1;
                    continue;
                };
                bad_choice=0;
                // reject products whose exclusive section of vector does
                not match
                for (int j=vector_size; j<size+xsize; j++)
                    if ((food[i]->taste[j] && ! user[id]->taste[j]) ||
                        (!food[i]->taste[j] &&   user[id]->taste[j])){
                            bad_choice=1;
                            break;
                    }
                if (!bad_choice) {   // choose closest vector
                    ret = food[id]->compare_preference(user[id]->basic,
                        user[id]->taste, vector_size);
                    if(ret < max) {
                        max = ret;
                        d_id = i;
                    }
                }
            }
            food[d_id]->chosen = 20;
            return d_id;
void teach_user(int id, int iter)
int dish;
int i,j;
            for(i=0;i < iter;i++) {
                dish = find_dish(id);
                printf("found dish %d \n",dish);
                printf("product vector: ");
                for (int ind=0; ind < vector_size + xsize; ind++)
                    printf("%d ", food[dish]->taste[ind]);
                printf("\n");
                taste_dish(id,dish);
            }
}
void init_users(int vec_size)
}
            user[user_count] = new PERSON(vec_size);
            user_count++;
}
            // reads product vectors
void init_dishes ( )
{
int i;
char c;
char buf[128];
char *taste;
FILE *fp;
            tp = topen("dish", "r");
            if(!fp) {
                cout << "Cannot open file";
                oxit(0);
            };
            fscanf(fp, "%d", &vector_size);   //reads size of preference
                                                vector
            fscan(fp, "%d", &xsize);           //reads size of exclusive
                                                vector
            taste = new char[vector_size+xsize];
            while (fscanf(fp, "%s %d %d %d %d",buf,&taste[0],
                &taste[1],&taste[2], &taste[3]) == 5)
                    food[food_count] = new DISH(vector_size+
                        xsize);
                    food[food_count]-> set_taste(taste, vector_size+
                        xsize);
                    food[food_count]-> chosen=0;
            printf("food %d is: ",food_count);
            for (int ind = 0; ind < vector_size; ind++)
                    printf("%d ", food[food_count]->taste[ind]);
            printf("\n");
            food_count++;
        }
}
main( )
{
            init_dishes( );
            init_users(vector_size+xsize);
            teach_user(0,100);
#include <stdlib.h>
#include <iostream.h>
#include <string.h>
class preference{
public:
            virtual ~preference( );
            preference( ) { };
            preference(int vsize);
            void set_basic(const char * const arg) {
                memcpy(basic,arg,sizeof(basic));
            void set_taste(const char* const arg, int vector_size) {
                for (int i=0; i<vector_size;i++) {
                    taste[i]=arg[i];
                };
            };
            bool compare_basic(char *arg) {
                int i;
                for(i=0;i<vector_size;i++)
                    if(basic[i] != arg[i])
                        return false;
                return true;
            };
            int compare_taste(char *arg, int vsize) {
                int i;
                int ret = 0;
                int data;
                for(i=0; i<vector_size;i++) {
                    data = taste[i] – arg[i];
                    ret += data * data;
                }
                return ret;
            };
            int compare_preference(char *b, char *t, int vsize) {
                return compare_taste(t, vsize);
            };
            int vector_size;
            char *basic;
            char *taste;
};
```

APPENDIX-continued

```
preference::preference(int vsize) {
            vector_size=vsize;
            basic = new char[vsize];
            taste = new char[vsize];
            memset(basic,0,sizeof(basic));
            memset(taste,0,sizeof(taste));
            };
preference::~preference( ) { };
typedef class preference PREFERENCE;
class person: public preference{
public:
        int set_last_name(char *name);
        int set_first_name(char *name);
        int get_last_name(char *name);
        int get_first_name(char *name);
        person( ) {/*last_name = 0; first_name=0;*/}
        person(int vsize) : preference(vsize)
        {/*last_name = 0; first_name=0; */}
        person(const person& rhs);
        ~person( ) {
                  // if(last_name)delete [ ] last_name;
                  // if(first_name) delete [ ] first_name;
                  }
        person& operator=(const person& rhs);
private;
        char *last_name;
        char *first_name;
};
typedef class person PERSON;
class receipy {
private:
        char *name;
};
typedef class receipy RECEIPY;
class dish: public preference{
private:
        char *name;
        RECEIPY receipy;
public:
        int chosen;
        dish(int v) : preference(v) { };
};
typedef class dish DISH;
```

What is claimed is:

1. A computer-implemented method for creating a food preference vector, the preference vector comprising a plurality of fields that represent specific user preferences, the method comprising the steps of:

(A) asking a pre-determined question eliciting information about the user's preference for a food with a specific characteristic;

(B) storing a user response to the question in a field in the preference vector corresponding to the specific characteristic;

(C) repeating steps (A)–(B) until all preference questions have been asked;

(D) accessing a recipe for a menu with characteristics;

(E) determining the suitability of the menu based on a comparison of the characteristics of the recipe for the menu with user preferences obtained from the food preference vector wherein the determining the suitability of the menu further comprises assigning a suitability weight to the menu based on a comparison of the characteristics of the recipe for the menu with the user preferences; identifying a last time the menu was used; and modifying the suitability weight based on the identified time of last use;

(F) recommending the menu to the user if the menu is found to be suitable; and (G) updating the user food preference vector based on user satisfaction of the recommended menu.

2. The computer-implemented method of claim 1 wherein the preference vector comprises:

(A) exclusive preference positions for storing the user's absolute preferences for a first set of specific characteristics relating to a product; and (B) non-exclusive preference positions for storing the degree of user preference for a second set of specific characteristics relating to a product.

3. The computer-implemented method of claim 1 wherein the preference vector comprises exclusive preference positions for storing the user's absolute preferences for a first set of specific characteristics relating to a product, and non-exclusive preference positions for storing the degree of user preference for a second set of specific characteristics relating to a product, the method further comprising the steps of:

(A) asking basic system parameter questions;

(B) asking exclusive preference questions;

(C) setting the exclusive preference positions of the preference vector based on user responses to the exclusive preference questions;

(D) asking additional questions for matching user preferences to a preset model;

(E) selecting a preset model for representing user preferences based on the user responses to the basic system parameter questions, exclusive preference questions, and the additional questions;

(F) setting default values for the non-exclusive preference positions based on the selected preset model; and (G) asking questions for modifying the default values of specified non-exclusive preference positions for better representing user preferences.

4. The computer-implemented method of claim 1 wherein the preference vector is a food preference vector and the step of asking a pre-determined question comprises the step of asking a pre-determined question about a particular food characteristic.

5. The computer-implemented method of claim 1 wherein the food preference vector comprises exclusive preference positions for storing the user's absolute preferences for a first set of specific food characteristics, and non-exclusive preference positions for storing the degree of user preference for a second set of specific food characteristics, the step of determining the suitability of the menu further comprising the steps of:

(A) representing the recipe in a recipe vector comprising exclusive positions and non-exclusive positions;

(B) comparing the exclusive preference positions of the food preference vector with the exclusive positions of the recipe vector;

(C) assigning a suitability weight to the recipe if the exclusive preference positions match the exclusive positions of the recipe vector, wherein the suitability weight is based on a comparison of the non-exclusive preference positions with the non-exclusive positions of the recipe vector.

6. The computer-implemented method of claim 1 further comprising the step of changing the menu from a remote location after user selection of the recommended menu.

7. The computer-implemented method of claim 1 further comprising the step of providing a cooking instruction to the user upon user selection of the recommended menu.

8. The computer-implemented method of claim 1 further comprising the steps of:

(A) determining which ingredients are necessary for preparing the recommended menu;

(B) checking a home product database for the ingredients necessary for preparing the recommended menu where the home product database contains an inventory of all food related products in the user home;

(C) placing ingredients missing from the home product database into a shopping list.

9. The computer-implemented method of claim 8 further comprising the step of transmitting the shopping list to a store via a network connection.

10. The computer-implemented method of claim 9 further comprising the step of automatically updating the home product database upon receipt of items in the shopping list.

11. In an automated maid system including a computer, an apparatus for creating a food preference vector, the preference vector comprising a plurality of fields that represent specific user preferences, the apparatus comprising:

(A) means for asking a pre-determined question eliciting information about the user's preference for a food with a specific characteristic;

(B) means for storing a user response to the question in a field in the preference vector corresponding to the specific characteristic;

(C) means for accessing a recipe for a menu with characteristics;

(D) means for determining the suitability of the menu based on a comparison of characteristics of the recipe for the menu with user preferences obtained from the food preference vector, wherein the means for determining the suitability of the menu further comprises means for assigning a suitability weight to the menu based on a comparison of the characteristics of the recipe for the menu with the user preferences; means for identifying a last time the menu was used; and means for modifying the suitability weight based on the identified time of last use;

(E) means for recommending the menu to the user if the menu is found to be suitable; and (F) updating the user food preference vector based on user satisfaction of the recommended menu.

12. A computer-implemented method for recommending recipes catered to a particular user's preferences, the method comprising:

creating a user preference vector having a plurality of fields, each field corresponding to an objectively measurable characteristic associated with food;

asking a pre-determined question for measuring the user's food preferences;

storing a preference value in the user preference vector for at least a portion of the objectively measurable characteristics based on a user response to the question;

retrieving a recipe from a menu recommendation database, the recipe being associated with a plurality of recipe characteristic values associated with the objectively measurable characteristics in the user preference vector;

comparing the recipe characteristic values with the preference values in the user preference vector;

assigning a suitability weight to the recipe based on the comparison;

identifying a last time the recipe was used;

modifying the suitability weight based on the identified time of last use;

selecting the recipe as a recommended recipe based on the suitability weight; and displaying the recommended recipe on a user display.

13. The method of claim 12 further comprising:

retrieving a list of ingredients for preparing the recommended recipe; and writing the retrieved list of ingredients into a shopping list.

14. The method of claim 12 further comprising:

creating a recipe vector having the same fields as the user preference vector; and storing the recipe characteristic values in the recipe vector.

15. A computer-implemented method for recommending recipes catered to a particular user's preferences, the method comprising:

creating a user preference vector having a plurality of fields, each field corresponding to an objectively measurable food characteristic;

asking a pre-determined question eliciting a user rating of one of the objectively measurable food characteristics, the user rating indicating a degree of preference for the food characteristic;

storing the user rating in the corresponding field of the user preference vector;

retrieving a recipe from a menu recommendation database, the recipe being associated with a plurality of recipe characteristic values associated with the objectively measurable food characteristics in the user preference vector;

comparing the recipe characteristic values with the user ratings in the user preference vector;

assigning a suitability weight to the recipe based on the comparison;

identifying a last time the recipe was used;

modifying the suitability weight based on the identified time of last use;

selecting the recipe as a recommended recipe based on the suitability weight; and displaying the recommended recipe on the user display.

16. The method of claim 15 further comprising:

retrieving a list of ingredients for preparing the recommended recipe; and writing the retrieved list of ingredients into a shopping list.

17. The method of claim 15 further comprising:

creating a recipe vector having the same fields as the user preference vector; and storing the recipe characteristic values in the recipe vector.

18. A computer system for recommending recipes catered to a particular user's preferences, the system comprising:

means for storing a user preference vector having a plurality of fields, each field corresponding to an objectively measurable characteristic associated with food;

a display for presenting to the user a pre-determined question designed to measure the user's food preferences;

a user input for receiving a user response to the pre-determined question presented on the display, wherein the user response is used to store a preference value in the user preference vector for at least a portion of the objectively measurable characteristics;

a menu recommendation database for storing a plurality of recipes, each recipe being associated with a plurality of recipe characteristic values associated with the objectively measurable characteristics;

a choice subsystem including logic for retrieving one of the recipes from the menu recommendation database, for comparing the recipe characteristic values with the preference values in the user preference vector, for assigning a suitability weight to the recipe based on the comparison, for identifying a last time the recipe was used, for modifying the suitability weight based on the identified time of last use, for selecting the recipe as a recommended recipe based on the suitability weight, and for displaying the recommended recipe on a user display.

19. The computer-implemented method of claim 1, wherein the updating the user food preference vector further comprises:

receiving user feedback about a particular characteristic of the recommended menu;

searching for a field in the preference vector corresponding to the particular characteristic; and modifying the value in the field corresponding to the particular characteristic based on the user feedback, the modified value enabling a more accurate representation of the user's food preferences.

20. The system of claim 11, wherein the means for updating the user food preference vector further comprises:

means for receiving user feedback about a particular characteristic of the recommended menu;

means for searching for a field in the preference vector corresponding to the particular characteristic; and means for modifying the value in the field corresponding to the particular characteristic based on the user feedback, the modified value enabling a more accurate representation of the user's food preferences.

* * * * *